UNITED STATES PATENT OFFICE.

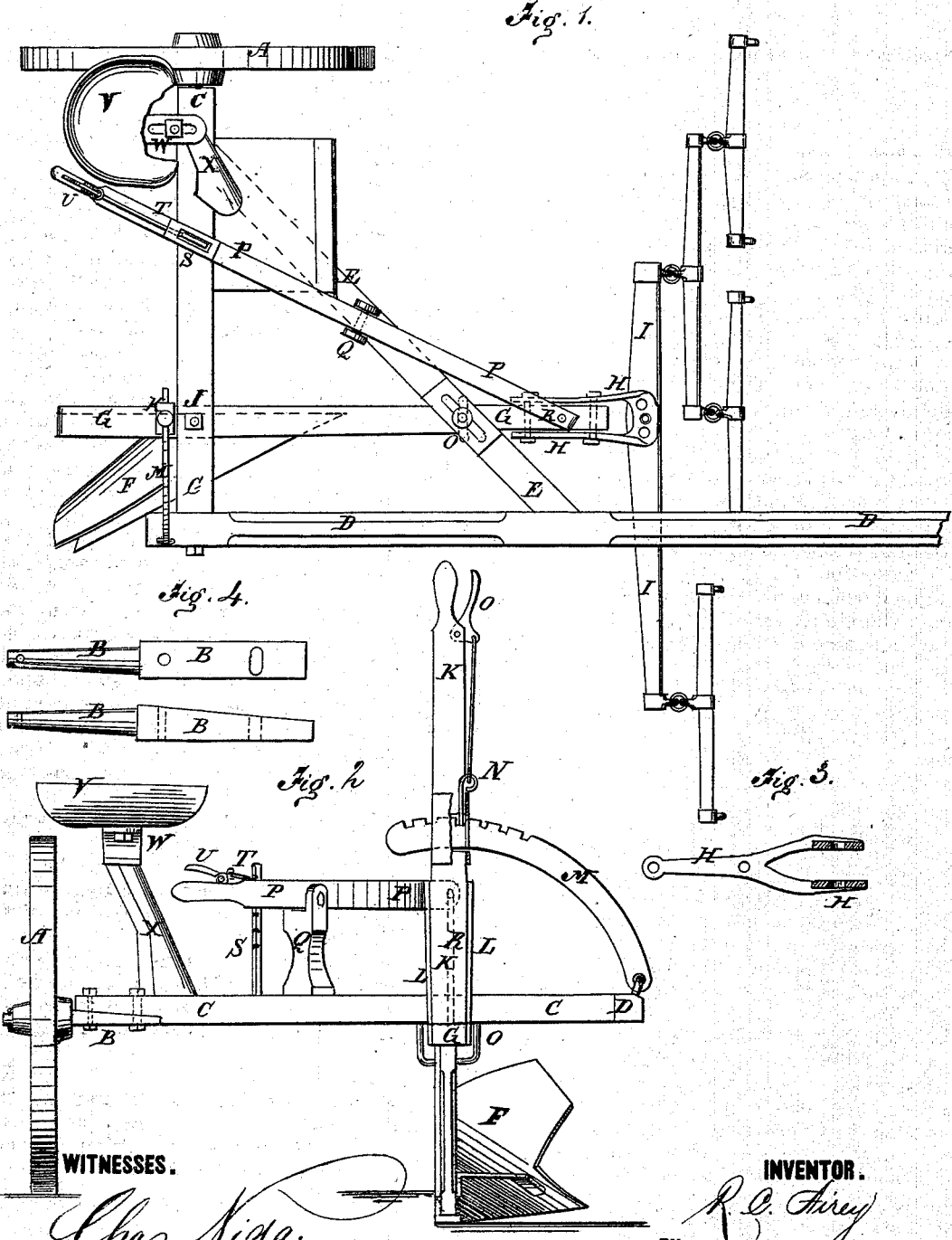

ROBERT C. AIREY, OF HIGHLAND, ILLINOIS.

IMPROVEMENT IN ONE-WHEELED THREE-HORSE RIDING-PLOWS.

Specification forming part of Letters Patent No. 146,562, dated January 20, 1874; application filed November 8, 1873.

*To all whom it may concern:*

Be it known that I, ROBERT C. AIREY, of Highland, in the county of Madison and State of Illinois, have invented a new and useful Improvement in One-Wheeled Three-Horse Riding-Plow, of which the following is a specification:

Figure 1 is a top view of my improved machine. Fig. 2 is a rear view of the same. Fig. 3 is a detail section of the clevis. Fig. 4 is a top and a side view of the axle.

Similar letters of reference indicate corresponding parts.

My invention has for its object to furnish an improved one-wheeled three-horse riding-plow, simple in construction, convenient in use, easily adjusted, guided, and controlled, and effective and reliable in operation.

The invention relates to the arrangement of the hinged beam and devices for adjusting the same, as hereinafter described.

The short axle B of the wheel A is secured to the end of the cross-beam C by two bolts, one of which passes through an elongated transverse slot, so that the said axle B may be adjusted to set the wheel, and at an angle to the beam. To the other end of the cross-beam C is secured the rear end of the tongue D, and the two are braced by a beam, E. The plow F is attached to the plow-beam G in the ordinary manner. The clevis H, to which the double-tree or triple-tree I is secured, has arms, which are secured to opposite sides of the beam G by screw-bolts, several holes being formed in the said beam G to receive the forward bolt, so that the line of draft, and consequently the pitch of the plow, may be conveniently regulated. The plow-beam G is hinged to the cross-beam C by eyebolts J, so that the plow F may be swung out and in, as desired. K is an upright lever, the lower end of which rests upon the plow-beam G at the rear side of the cross-beam C, where it is secured in place by two straps, L, attached to the opposite sides of its lower end. The lower ends of the straps L project below the beam G, pass through a yoke placed upon the lower side of the said plow-beam G, and have screw-threads cut upon them to receive the nuts by which the yoke, straps, and lever are secured in place. The lever K moves along the side of the curved and notched bar M, the lower end of which is secured to the rear end of the tongue D, and its upper part passes through a slot formed in, or a keeper attached to, the lever K. The lever K is secured in place, when adjusted, by a pawl, N, which is operated by a small hand-lever pivoted to the upper part of the lever K, so that it may be operated by the hand that operates said lever K. O is a slotted bar or keeper, through which the plow-beam G passes, and the upper end of which passes up through a slot in the brace-beam E, where it is secured in place by a nut, so that it may be readily adjusted to correspond with the adjustment of the plow-beam. The lever P is pivoted to a standard, Q, and connected by a rod, R, to the plow-beam G. Thus the forward end of the beam may be raised and lowered to cause the plow to run out of and into the ground, as required. The notched bar S passes through a slot formed in, or a keeper attached to, the lever P, so that the said lever P may be held in place by a pawl, T, operated by a small hand-lever, U, which is pivoted to the rear part of said lever P. The driver's seat is attached to the short arm of a U-spring, W, which is secured upon a standard, X, by a bolt passing through a slot in the said spring. Thus the said seat can be conveniently adjusted, as the weight of the driver may require.

I do not claim a hinged plow-beam; but,

Having thus described my invention, I claim as new and desire to secure by Letters Patent—

1. The combination, with the hinged plow-beam G, hinged arc-bar M, lever K, and locking device N O, of the horizontal lever P, rod R, and adjustable keeper O, as shown and described.

2. The combination of the slotted beam E, arranged diagonally with beam D and axle C, adjustable keeper O, hinged plow-beam G, hinged arc-bar M, lever K, and locking device N O, as shown and described.

ROBERT C. AIREY.

Witnesses:
JOHN MENZ,
LUCIUS GRAPP.